(12) United States Patent
Thiriet et al.

(10) Patent No.: US 12,208,912 B2
(45) Date of Patent: Jan. 28, 2025

(54) HYBRID PROPULSION SYSTEM FOR A HELICOPTER

(71) Applicant: SAFRAN HELICOPTER ENGINES, Bordes (FR)

(72) Inventors: Romain Jean Gilbert Thiriet, Moissy-Cramayel (FR); Fabien Mercier-Calvairac, Moissy-Cramayel (FR); Stéphane Albert André Douillard, Moissy-Cramayel (FR)

(73) Assignee: SAFRAN HELICOPTER ENGINES, Bordes (FR)

(*) Notice: Subject to any disclaimer, the term of this patent is extended or adjusted under 35 U.S.C. 154(b) by 0 days.

(21) Appl. No.: 18/256,855

(22) PCT Filed: Dec. 3, 2021

(86) PCT No.: PCT/FR2021/052209
§ 371 (c)(1),
(2) Date: Sep. 8, 2023

(87) PCT Pub. No.: WO2022/123158
PCT Pub. Date: Jun. 16, 2022

(65) Prior Publication Data
US 2024/0092497 A1    Mar. 21, 2024

(30) Foreign Application Priority Data
Dec. 11, 2020 (FR) ..................... 2013046

(51) Int. Cl.
*B64D 35/023* (2024.01)
*B64C 27/12* (2006.01)
*B64D 31/18* (2024.01)

(52) U.S. Cl.
CPC ............ *B64D 35/023* (2024.01); *B64C 27/12* (2013.01); *B64D 31/18* (2024.01)

(58) Field of Classification Search
CPC .. B64C 27/14; B64D 31/00; B64D 2027/026; B64D 35/08; B64D 27/24
See application file for complete search history.

(56) References Cited

U.S. PATENT DOCUMENTS

| 2017/0225573 A1* | 8/2017 | Waltner | ................ B60L 50/16 |
| 2018/0163558 A1* | 6/2018 | Vondrell | ................ B64D 27/10 |

(Continued)

FOREIGN PATENT DOCUMENTS

| EP | 2571763 A2 | 3/2013 |
| EP | 3034834 A1 | 6/2016 |

(Continued)

OTHER PUBLICATIONS

International Search Report and Written Opinion issued in International Application No. PCT/FR2021/052209, mailed on Jun. 16, 2022.

(Continued)

*Primary Examiner* — Philip J Bonzell
*Assistant Examiner* — Ashesh Dangol
(74) *Attorney, Agent, or Firm* — Bookoff McAndrews, PLLC

(57) ABSTRACT

Propulsion system for a helicopter comprising a main engine, a main rotor, a main gearbox including an output mechanically connected to the main rotor, a reduction gearbox mechanically coupled between the main engine and a first input of the main gearbox, and an assistance device. The assistance device comprises a first electric machine mechanically coupled to the reduction gearbox and configured to operate as an electric generator to take off energy produced by the main engine, and a second electric machine mechanically coupled to a second input of the main gearbox, the second electric machine being supplied with electrical power by the first electric machine and configured to operate (Continued)

as an electric motor to deliver additional mechanical power to the main gearbox.

11 Claims, 2 Drawing Sheets

(56) References Cited

U.S. PATENT DOCUMENTS

2019/0352001 A1* 11/2019 Thiriet .................... B64C 27/12
2019/0382124 A1* 12/2019 Massot ................... B64C 27/12

FOREIGN PATENT DOCUMENTS

| EP | 2571763 | B1 | 5/2017 |
| FR | 2962404 | A1 | 1/2012 |
| FR | 3019588 | A1 | 10/2015 |
| FR | 3062882 | A1 | 8/2018 |
| FR | 3080835 | A1 | 11/2019 |
| WO | 2011144692 | A2 | 11/2011 |

OTHER PUBLICATIONS

Search Report issued in French Application No. 2013046, mailed on Aug. 11, 2021.

* cited by examiner

[Fig. 1]
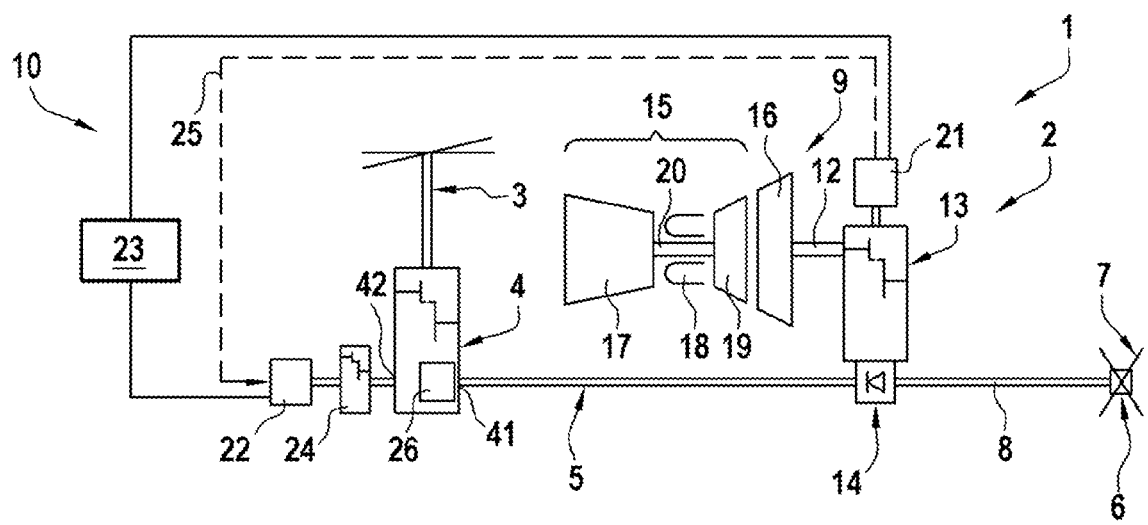
[Fig. 2]
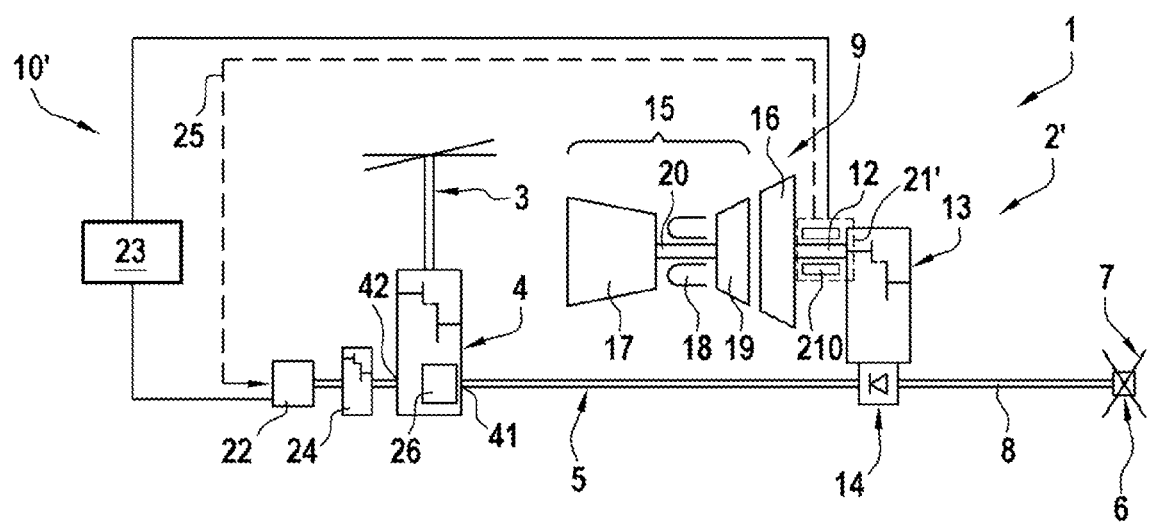

[Fig. 3]
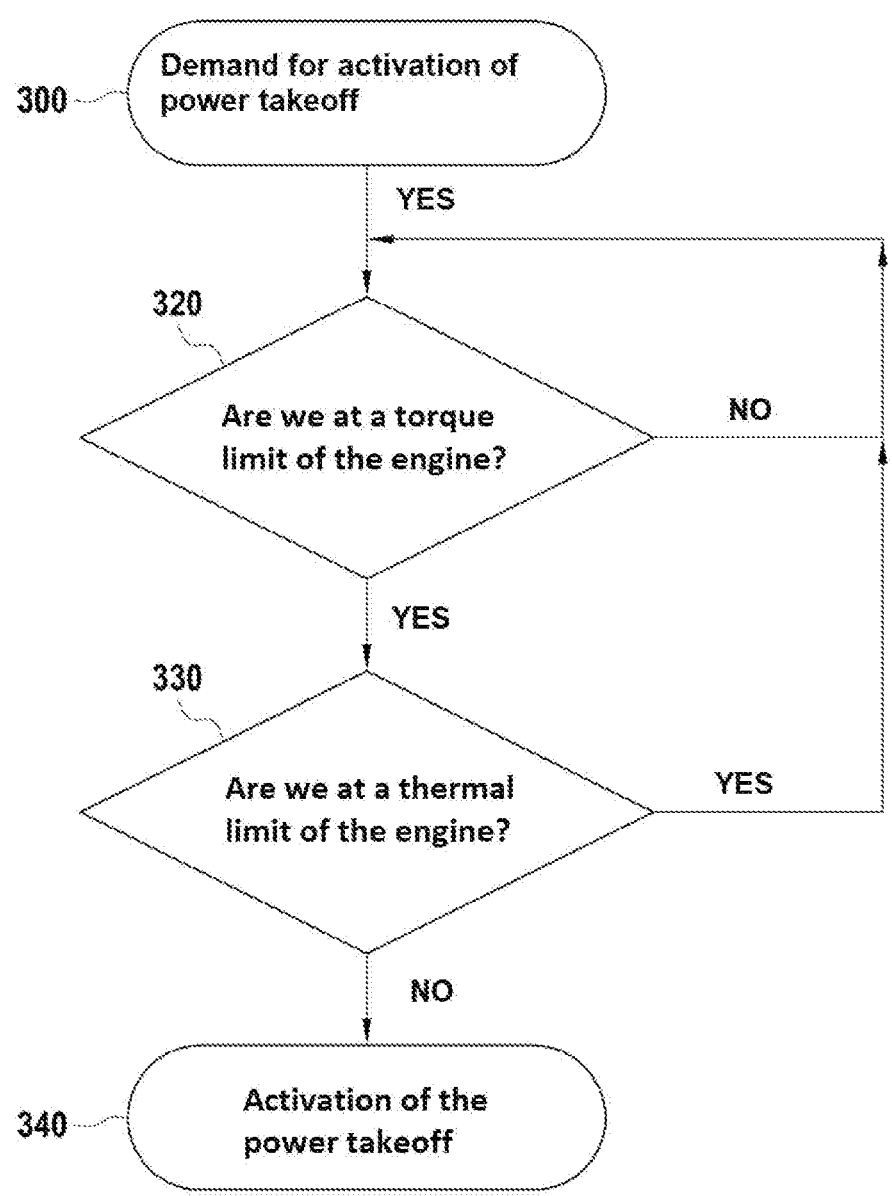

HYBRID PROPULSION SYSTEM FOR A HELICOPTER

CROSS-REFERENCE TO RELATED APPLICATIONS

This is a National Stage Application under 35 U.S.C. § 371 of International Application No. PCT/FR2021/052209, filed Dec. 3, 2021, now published as WO 2022/123158 A1, which claims priority to French Patent Application No. 2013046, filed on Dec. 11, 2020.

TECHNICAL FIELD

The present invention relates to the general field of helicopter propulsion systems and more particularly to the field of hybrid propulsion systems for a helicopter, in particular a helicopter called a single-engine helicopter.

PRIOR ART

A single-engine helicopter is a helicopter comprising a propulsion system including a single main engine, namely generally an internal-combustion engine and for example a turbine engine, for driving a main rotor via a main gearbox, called MGB, and a rear tail rotor (also known under the acronym of ATR for anti-torque rotor) via a rear gearbox called RGB.

The propulsion system can also comprise a device for assisting the helicopter. The assistance device is used in an emergency situation in order to momentarily contribute power to the helicopter, and more precisely to the main and rear rotors.

A first emergency is the failure of the main engine. In this situation, the pilot then initiates a degraded flight mode known by the term flight in autorotation. The assistance device allows mechanically assisting the helicopter during flight in autorotation, and particularly during the first and/or last phases of flight (accomplishment of the "flare" prior to landing). An assistance device of this type thus allows significantly aiding the pilot in accomplishing a landing in autorotation.

A second emergency is an immediate need for additional power during obstacle avoidance or an inversion of temperature at altitude for example.

Known from document FR 3 019 588 are different architectures for the integration of an assistance device. The assistance device comprises a turbine for driving a shaft in rotation, supplied with power by a gas generator with solid-state storage and controlled means for supplying power to the drive turbine. The mechanical rotation power of the shaft is, in the present case, used to drive the main rotor of the helicopter by introducing this power either directly at the MGB, or at a front transmission shaft, or at a shaft of a free turbine of the turbine engine (main engine).

Such propulsion systems cause problems with bulk. In fact, the integration of an assistance device of this type in an already compact engine compartment generates considerable modifications both in the airframe of the helicopter and at the main engine, and in the transmission of power between the main engine and the MGB.

In addition, the introduction of this power on the free turbine of the main turbine engine has several disadvantages.

A first disadvantage is that in the event of a failure of gas supply to the free turbine of the main turbine engine, it produces no drive torque and will decelerate very rapidly under the influence of losses by aerodynamic friction. These losses can reach several tens of kilowatts (kW). It is thus understood that depending on the application cases mentioned above, namely failure of the main engine or immediate need for additional power to avoid an obstacle, the drive power effectively seen by the main rotor is different, which could surprise the pilot of the helicopter.

A second disadvantage is that when injecting the assistance power via the free turbine, it is not possible to supply this assistance power to the main and rear gearboxes in the event of failures of said free turbine and/or of the mechanically downstream components of the turbine engine, and particularly the reduction gearbox of the turbine engine for turbine engines equipped with a reduction gearbox of this type.

A third disadvantage is that it is necessary to provide a specific interface on the turbine engine to allow the injection of this assistance power on the free turbine.

Moreover, the power of the turbine engines of helicopters is limited thermodynamically, and also mechanically due to the fact that the mechanical torque transmitted to the main rotor of a helicopter passes through the reduction gearbox and through the main gearbox.

When the ambient temperatures and the altitude are low, it is known that the power which passes via the MGB input is limited by design to a torque value which must not be continuously exceeded. Thus, when the rotation speed of the rotor of the helicopter decreases, to limit acoustic pollution for example, the power delivered to the rotor decreases proportionately. On the other hand, when the temperature and the altitude are high, the power delivered by a helicopter turbine engine is limited by the thermodynamic power of the free turbine.

Known from document FR 3 062 882 is a propulsion system of a single-engine helicopter comprising a main engine connected to a front transmission shaft and a rear transmission shaft, respectively able to drive an MGB and an RGB; an assistance device fastened to the main engine and allowing mechanically driving the RGB and MGB by the introduction of power on said rear transmission shaft.

However, the assistance device described in this document uses an auxiliary energy source such as pyrotechnic and/or electrotechnical and/or electrical and/or hydraulic and/or pneumatic means. This auxiliary energy source forms an additional element to be integrated into the propulsion system of the helicopter, thus increasing the bulk and the total mass of the assistance device and therefore of the propulsion system. Also known from document FR 3 080 835 is an assistance system having only a single, reversible, electric machine, which needs to be associated with a storage battery to operate in motor mode and to assist the main engine via the MGB. The availability and the duration of the assistance allowed by the system are necessarily limited by the capacity of the storage battery and its effective charge at the time of need.

DISCLOSURE OF THE INVENTION

To this end, the present invention proposes a propulsion system of a helicopter comprising an assistance device allowing correcting the aforementioned disadvantages and in particular optimizing the integration of the assistance device while reducing mass and bulk.

In one object of the invention, a propulsion system for a helicopter is proposed, comprising a main engine, a main rotor, a main gearbox including an output connected mechanically to the main rotor, a reduction gearbox mechanically coupled between the main engine and a first input of the main gearbox, and an assistance device.

According to a technical feature of the invention, the assistance device comprises a first electric machine mechanically coupled to the reduction gearbox and configured to operate as an electric generator to take off energy produced by the main engine, and a second electric machine mechanically coupled to a second input of the main gearbox, the second electric machine being supplied with electrical power by the first electric machine and configured to operate as an electric motor to deliver additional mechanical power to the main gearbox.

The propulsion system according to the invention thus proposes an architecture applicable both to turbine engines with free turbines and to turbine engines with linked turbines, and allowing using the entire thermodynamic power available upstream of the reduction gearbox via a power takeoff accomplished by means of two electric machines generating an auxiliary coupling between the main engine and the main gearbox.

In fact, the propulsion system according to the invention thus allows having an assistance device using the additional energy that the main engine can supply to compensate torque losses generated by the reduction gearbox. In other words, the power losses induced by the reduction gearbox are restored due to the quantity of energy available on the gas generator and which can be transformed by the assistance device into propulsive electrical energy, i.e. used to delivery additional mechanical power to the main gearbox.

Thus, when the power delivered to the MGB is limited by the maximum torque allowed at the output of the engine-propulsion unit including the main engine and the reduction gearbox, and/or at the input of the MGB, the electric machine mounted upstream of the reduction gearbox supplies electrical energy to the other electric machine operating in motor mode on another input of the MGB. This additional power which passes through the mast of the main rotor can be used for emergencies necessitating a surplus of lift (avoiding obstacles . . . ) without damaging the reduction gear.

According to a first aspect of the propulsion system, the propulsion system can also comprise an electronic control unit electrically coupled with the first and second electric machines and configured to control the operation of the first and second electric machines depending on the available output torque of the main engine and on the output torque required from the main gearbox.

According to a second aspect of the propulsion system, the electronic control unit can comprise measurement means configured to continuously measure the instantaneous torque at the first input of the main gearbox, and control means configured to control the operation of the first electric machine to supply power to the second electric machine when the torque measured by the measurement means is less than the output torque required from the main gearbox, and command an increase of the operating speed to supply the additional energy necessary for the electrical power supply of the second electric machine.

The instantaneous torque measured on the first input of the main gearbox can also be compared to a maximum allowed torque at this first input. If the measured torque reaches the maximum allowed torque, the electronic control unit can command no longer increasing the operating speed of the main engine, while continuing to command the operation as a generator of the first electric machine to supply the second electric machine with power.

According to a third aspect of the propulsion system, the control unit can be configured to control the first and second electric machines to compensate for the lack of output power of the main gearbox when the main rotor operates at a lower speed than its nominal speed in a flight phase requiring that the main rotor operate at said nominal speed.

According to a fourth aspect of the propulsion system, the main engine can comprise an output shaft mechanically connected to the reduction gearbox, and the first electric machine comprises a rotor and a stator, the rotor being formed by an electromagnetic portion of the output shaft of the main engine and the stator being mounted around said electromagnetic portion of the output shaft of the main engine.

According to a fifth aspect of the propulsion system, in the first electric machine the reduction gearbox can be an epicyclic reduction gearbox coupled simultaneously to the main engine, to the first electric machine and to the main gearbox.

According to a sixth aspect of the propulsion system, the propulsion system can also comprise a overrunning clutch coupled to the output of the reduction gear, a rear transmission shaft coupled between the overrunning clutch and an anti-torque rotor and a front transmission shaft coupled between the first input of the main gearbox and the overrunning clutch.

According to a seventh aspect of the propulsion system, the assistance device can also comprise at least one means for storing energy electrically coupled to the first electric machine. The electronic control unit can then be configured to transmit the electrical energy from the first electric machine either to the energy storage or to the second electric machine depending on energy needs when the first electric machine is producing electricity.

According to another object of the invention, a helicopter is proposed comprising a propulsion system as defined above.

According to another object of the invention, a method is proposed for assisting a system of a propulsion system for a helicopter as defined above, the method comprising a demand for activating taking off mechanical energy from the main engine of the propulsion system by means of a command to operate as an electric generator of the first electric machine, the activation demand being the result of a decision depending on at least one particular condition verified by the pilot of the helicopter, or by the control computer of the engine, or by the avionics of the helicopter.

In one aspect of the assistance method, the activation demand can be the result of a decision of the control computer of the engine when it detects that the operating point of the main engine is located in a set of predetermined operating points for which the operating speed of the main engine is less than a percentage threshold of the nominal operating speed of the main engine and for which an acceleration transient to return to a higher speed greater than said percentage threshold is considered too long compared to a desired dynamics of the main engine and of the helicopter, and in which the activation demand is accompanied by a command for increasing the operating speed of the main engine so that the duration of a possible acceleration transient is reduced to correspond to said desired dynamics.

Preferably, said percentage threshold of the nominal operating speed of the main engine is comprised between 80% and 85%.

BRIEF DESCRIPTION OF THE DRAWINGS

FIG. 1 is a schematic representation of a helicopter provided with a propulsion system according to a first embodiment of the invention.

FIG. 2 is a schematic representation of a helicopter provided with a propulsion system according to a second embodiment of the invention.

FIG. 3 shows a flowchart of a method for assisting a propulsion system of a helicopter according to one mode of implementation of the invention.

DESCRIPTION OF THE EMBODIMENTS

Shown schematically in FIG. 1 is a helicopter 1 comprising a propulsion system 2 according to a first embodiment of the invention.

The propulsion system 2 comprises a main rotor 3, a main gearbox 4 (hereafter called MGB), a front transmission shaft 5, a rear gearbox 6 (hereafter called RGB) and a rear rotor 7 commonly called the anti-torque rotor (ATR). The main rotor 3 is driven by the MGB 4 which itself is driven by the front transmission shaft 5. Likewise, the rear rotor 7 is driven by the RGB 6 which itself is driven by a rear transmission shaft 8. In the present case, the front and rear transmission shafts 5, 8 are substantially coaxial.

The propulsion system 2 of the helicopter 1 also comprises a main engine 9 and an assistance device 10 used in an emergency in order to momentarily contribute additional power to the helicopter 1, and more precisely to the main rotor 3.

According to the embodiment illustrated in FIGS. 1 and 3, the main engine 9 comprises an output shaft 12 connected mechanically to the front and rear transmission shafts 5, 8 via a reduction gearbox 13, then a first overrunning clutch 14, called the propulsive overrunning clutch. It is noted that in the present invention, the terms "front" and "rear" associated with the transmission shafts 5, 8 are expressed depending on the first overrunning clutch 14.

As illustrated in FIG. 1, the main engine here is a turbine engine formed by a gas generator 15 and a free turbine 16 to which is attached the output shaft 12. The gas generator 15 comprises in known fashion at least one air compressor 17 supplying a combustion chamber 18 with a fuel in the compressed air which delivers hot gases to at least one gas expansion turbine 19 which drives the compressor 17 in rotation via a drive shaft 20. The gases then drive the free turbine 16 for transmitting power, also called the power turbine.

As a variant, generally, the main engine 9 can correspond to any type of internal combustion engine.

As illustrated in FIG. 1, the assistance device 10 comprises a first electric machine 21, a second electric machine 22 and an electronic control unit 23.

The first electric machine 21 is coupled mechanically to the reduction gearbox 13 and is configured to operate as an electrical energy generator, thus transforming the mechanical energy taken off the main engine 9 via the reduction gearbox 13 into electrical energy.

The second electric machine 22 is mechanically connected to the MGB 4 possibly via a gear train 24, as illustrated in FIG. 1, and electrically connected to the first electric machine 21 via at least one cable 25. Due to the cable 25, the first electric machine 21 can thus supply the second electric machine 22 with electrical power using a portion of the energy delivered by the main engine 9 and recovered via the reduction gear 13.

The second electric machine 22 is configured, for its part, to operate as an electric motor and thus deliver mechanical power in the form of a mechanical torque to the MGB 4 using the electrical energy supplied by the first electric machine via the cable 15.

The electronic control unit 23 is not only coupled to the first electric machine 21 and to the second electric machine 22 as illustrated in FIG. 1, but also to the main engine 9.

The electronic control unit 23 is configured to control the operation of the first and second electric machines 21 and 22 depending on the torque received at the input of the MGB 4 and on the torque required at the output of the MGB 4 by the main rotor 3.

The MGB 4 comprises a first input 41 mechanically connected to the front transmission shaft 5 and a second input mechanically connected to the second electric machine 22, possibly via a gear train 24. The electronic control unit 23 comprises a torque measurement module 26 mounted on the first input 41 and configured to continuously measure the torque received at the first input 41 of the MGB, this mechanical torque originating in the reduction gearbox 13 via an overrunning clutch 14.

When the output torque required of the MGB 4 is greater than the torque measured at its first input 41, the electronic control unit 23 controls the main engine 9 to produce a greater mechanical torque that that which it is currently producing, and activates the first electric machine 21 so that it takes off the additional torque portion supplied by the main engine 9 and thus supplies with electrical power the second electric machine 22, which can then supply an additional mechanical torque to the second input 42 of the MGB 4. The MGB 4 can then supply a torque greater than the mechanical torque received at its first input 41, or even equal to the torque required for the main rotor 2.

Thus when the speed of the Gas Generator 15 (NG) of the turbomachine is low, i.e. less than 85% of the nominal speed of the gas generator 15, the transients for returning to a high speed, i.e. greater than 85% of the nominal speed of the gas generator, can be long with assistance devices as described in the prior art, and the dynamics of the turbomachine and therefore of the helicopter are strongly impacted.

Due to the power take-off implemented by the assistance device 10 of the propulsion system 2 according to the invention, it is possible, due to the controlling of the main engine 9 and of the first and second electric machines 21 and 22 by the electronic control unit 23, to artificially take power off through the electrical circuit at speeds said to be high.

By maintaining a high speed, it is possible to distribute part of the power to the mechanical torque injected into the MGB 4, and the rest of it to the first electric machine 21 which will produce electricity which can optionally supply the second electric machine with power or charge an energy store such as a battery for example. It is also conceivable to provide means for dissipating the electricity produced by the first electric machine 21, for example thermal dissipation by means of electric resistors, which can be controlled selectively in particular in the case mentioned hereafter where it is desired to artificially increase the speed of the gas generator. This dissipation of the electricity produced can allow increasing the energy taken off by the power takeoff, and/or dissipating energy taken off when the battery is full and the second electric machine 22 does not need to be activated, and therefore in any case increasing the speed of the gas generator while still retaining the same mechanical torque injected into the MGB 4.

In order for the power takeoff to be activated (step 340) at least two conditions must be combined, as indicated in FIG. 3 which presents a flowchart of a method for assisting a propulsion system of a helicopter according to one mode of implementation. Following a demand for activation of the power takeoff (step 300), it is necessary to verify (step 320) that a limit on the drive torque is occurring which corresponds to a limit on the torque that the reduction gear can transfer and/or that the MGB can accept at its first input 41, and verifying (step 330) that a thermal limit of the engine is not occurring (a limit which can depend on the speed of the gas generator 15 or on a temperature in a given compartment of the engine).

The demand for activating the power takeoff can be the result of a decision depending on at least one particular condition verified by the pilot of the helicopter or by a control computer of the engine such as a FADEC, or even by the avionics of the helicopter, this list not being exhaustive. Thus, among the different sorts of decisions each of which can trigger a demand for activation of power takeoff, the three following categories will be noted in particular.

A decision originating with the pilot. The pilot knows that by demanding the activation of the power takeoff at the limit of the output torque of the gas turbine (or at the input of the MGB), he will have a more responsive propulsion system. In fact, the activation of the power takeoff causes an increase in the operating speed of the main engine of the propulsion system, i.e. the speed of the gas generator of the engine, or of the speeds of the main engines in the case of a two-engine or three-engine machine. This increased speed is favorable for the acceleration capacities of the propulsion system, particularly during a takeoff without an engine failure (called an AEO takeoff, for All Engines Operating) but especially during a takeoff with a failure in one of the engines (called an OEI takeoff for One Engine Inoperative) when the propulsion system of the helicopter has two or three engines.

A decision originating in the control computer of the engine (FADEC). In a first configuration the computer monitors in real time the error in the main rotor speed, this error being the gap between the measured speed of the main rotor and the set point speed of the main rotor. If the value of this gap is too high (the difference between the set point and the measurement is greater than a threshold), it means that a large transient additional power demand is occurring. The power takeoff can then help raise the effective speed of the main rotor.

In a second configuration, the computer monitors in real time the variation over time of the speed of the main rotor. Without waiting for the speed of the main rotor to reach a critical value, less than 85% of the nominal speed of the main rotor for example, the computer triggers the power takeoff if the slope of the decrease of the variation over time of the main rotor is greater than an absolute value threshold.

A decision originating in the avionics. For example, if the horizontal speed of the helicopter measured by the avionics is less than a threshold, equal for example to 50 knots, that signifies that the helicopter is in a takeoff or landing phase. There is therefore an advantage in causing power takeoff at the limit of the output torque of the free turbine of the gas generator, to increase the speed of the gas generator in order to be able to compensate for a possible case of takeoff or landing with one of the engines inoperative (OEI). In another example, if the set point of the speed of the main rotor is stabilized below the nominal speed of the main rotor, for example at 90% of the nominal speed, in order to limit noise, this implies that the speed of the main rotor is regulated at a low value relatively near the stalling speed of the main rotor (this stalling speed being for example located between 80% and 85% of the nominal speed). The power takeoff then allows increasing the NG speed of the two main engines for a two-engine propulsion system. This implies that in the event of an OEI failure of one of the engines, the higher speed of the healthy engine will allow it to have an additional torque reserve which can be supplied instantaneously to the main rotor by deactivation of the power takeoff, which allows limiting the drop of the NR speed consecutive with the OEI failure, in such a manner that the NR speed is held above the stalling speed.

Once power takeoff is activated, the degradation of efficiency at certain operating points will certainly slightly increase fuel consumption but will especially allow artificially increasing the speed of the gas generator 15 while retaining the same mechanical torque injected into the MGB 4.

By storing in memory in the electronic control unit the operating points of the main engine 9 which do not allow a satisfactory transient during an acceleration to guarantee the proper operation of the main rotor 3 of the helicopter 1, the assistance device 10 allows having available an instantaneous additional torque reserve. Thus, a demand for activation of the power takeoff can be the result of a decision of the control computer of the engine when it detects that the operating point of the main engine is located in a set of predetermined operating points for which the operating speed of the main engine is less than a percentage threshold of the nominal operating speed of the main engine, and for which an acceleration transient to return to a high speed greater than said percentage threshold is considered to be too long compared to a desired dynamics of the main engine and therefore of the helicopter. The demand for activation of the power takeoff is then accompanied by a command to increase the NG operating speed of the main engine, so that the duration of a possible acceleration transient is reduced to correspond with the desired dynamics of the main engine.

Said percentage threshold of the operating speed of the main engine can be comprised between 80% and 85%.

This control strategy and the expected effects are made possible due to electric technology and the rapidity of control which allow an instantaneous drop of the torque taken off for the power takeoff on the output shaft of the turbomachine.

Shown schematically in FIG. 2 is a helicopter 1 provided with a propulsion system 2 according to a second embodiment.

Elements identical to the first embodiment illustrated in FIG. 1 bear the same numerical references.

The second embodiment illustrated in FIG. 2 differs from the first embodiment illustrated in FIG. 1 in that the first electric machine 21' of the assistance device 10' comprises a rotor formed by a portion of the output shaft 12 of the main engine 9, and more particularly by electromagnetic elements mounted on the mechanical output shaft 12, and a stator 210 arranged around the portion of the output shaft 12 forming the rotor.

The first electric machine 21' is thus connected upstream of the reduction gear 13, more particularly between the main engine 9 and the reduction gearbox 13.

The propulsion system according to the invention thus provides an assistance device allowing optimizing the integration of the assistance device by reducing mass and bulk.

The invention claimed is:

1. A propulsion system for a helicopter comprising a main engine, a main rotor, an electronic control unit, a main gearbox including an output connected mechanically to the main rotor, a reduction gearbox mechanically coupled between the main engine and a first input of the main gearbox, and an assistance device, wherein the assistance device comprises a first electric machine mechanically coupled to the reduction gearbox and configured to operate as an electric generator to take off energy produced by the main engine, and a second electric machine mechanically coupled to a second input of the main gearbox via a gear train, the second electric machine being supplied with an electrical power by the first electric machine and configured to operate as an electric motor to deliver an additional mechanical power to the main gearbox when required, and wherein the mechanical coupling of the first electric machine to the reduction gearbox is independent from the mechanical coupling of the reduction gearbox to the main engine, the electronic control unit configured to control an output torque of the main engine.

2. The propulsion system according to claim 1, wherein the electronic control unit is electrically coupled to the first and second electric machines and configured to control operations of the first and second electric machines depending on an available output torque of the main engine and on a required output torque of the main gearbox.

3. The propulsion system according to claim 2, wherein the electronic control unit comprises a measurement means configured to continuously measure an instantaneous torque at the first input of the main gearbox, and the electronic control unit configured to control the operation of the first electric machine to supply power to the second electric machine when the instantaneous torque measured by the measurement means is less than the required output torque from the main gearbox, and command an increase of an operating speed of the main engine to supply an additional energy necessary for the electrical power supply of the second electric machine.

4. The propulsion system according to claim 2, wherein the electronic control unit is configured to control the operations of the first and second electric machines to compensate for a lack of output power of the main gearbox when the main rotor operates at a lower speed than its nominal speed in a flight phase necessitating that the main rotor operate at said nominal speed.

5. The propulsion system according to claim 1, wherein the reduction gearbox is an epicyclic reduction gearbox coupled simultaneously to the main engine, to the first electric machine and to the main gearbox.

6. The propulsion system according to claim 1, also comprising an overrunning clutch coupled to an output of the reduction gearbox, a rear transmission shaft coupled between the overrunning clutch and an anti-torque rotor, and a front transmission shaft coupled between the first input of the main gearbox and the overrunning clutch.

7. A helicopter comprising a propulsion system according to claim 1.

8. A method for assisting a system of a propulsion system for a helicopter according to claim 1, the method comprising a demand for activating taking off energy from the main engine of the propulsion system by means of a command to operate as an electric generator of the first electric machine, the activation demand being a result of a decision depending on at least one particular condition verified by a pilot of the helicopter, or by a control computer of the main engine, or by avionics of the helicopter.

9. The assistance method according to claim 8, wherein the activation demand is the result of the decision of the control computer of the main engine when it detects that an operating point of the main engine is located within a set of predetermined operating points for which an operating regime of the main engine is less than a percentage threshold of a nominal operating speed of the main engine and for which an acceleration transient to return to a faster speed greater than said percentage threshold is considered too long compared to a desired dynamics of the main engine and of the helicopter, and in which the activation demand is accompanied by a command for increasing an operating speed of the main engine so that a duration of a possible acceleration transient is reduced to correspond to said desired dynamics.

10. The assistance method according to claim 9, wherein said percentage threshold of the nominal operating speed of the main engine is comprised between 80% and 85%.

11. A method for assisting a system of a propulsion system for a helicopter, wherein the propulsion system includes:
    a main engine, a main rotor, a main gearbox including an output connected mechanically to the main rotor, a reduction gearbox mechanically coupled between the main engine and a first input of the main gearbox, and an assistance device,
    wherein the assistance device comprises a first electric machine mechanically coupled to the reduction gearbox and configured to operate as an electric generator to take off energy produced by the main engine, and a second electric machine mechanically coupled to a second input of the main gearbox, the second electric machine being supplied with an electrical power by the first electric machine and configured to operate as an electric motor to deliver an additional mechanical power to the main gearbox when required,
    the main engine comprising an output shaft driven by a power turbine of the main engine and mechanically connected to the reduction gearbox, and the first electric machine comprising a rotor and a stator, the rotor being formed by an electromagnetic portion of the output shaft of the main engine and the stator being mounted around said electromagnetic portion of the output shaft of the main engine,
    wherein the method comprises:
        a demand for activating taking off energy from the main engine of the propulsion system by means of a command to operate as an electric generator of the first electric machine, the activation demand being a result of a decision depending on at least one particular condition verified by a pilot of the helicopter, or by a control computer of the main engine, or by avionics of the helicopter,
        wherein the activation demand is the result of the decision of the control computer of the main engine when it detects that an operating point of the main engine is located within a set of predetermined operating points for which an operating regime of the main engine is less than a percentage threshold of a nominal operating speed of the main engine and for which an acceleration transient to return to a faster speed greater than said percentage threshold is considered too long compared to a desired dynamics of the main engine and of the helicopter, and in which the activation demand is accompanied by a command for increasing an operating speed of the main engine so that a duration of a possible acceleration transient is reduced to correspond to said desired dynamics.

* * * * *